United States Patent
Whitaker

[11] Patent Number: 6,061,862
[45] Date of Patent: May 16, 2000

[54] CLEANING APPARATUS

[75] Inventor: W. Michael Whitaker, Asheboro, N.C.

[73] Assignee: Whit Corporation, Ramseur, N.C.

[21] Appl. No.: 09/143,252

[22] Filed: Aug. 28, 1998

Related U.S. Application Data

[63] Continuation-in-part of application No. 09/047,528, Mar. 25, 1998, abandoned.

[51] Int. Cl.[7] .................................... A47L 13/12
[52] U.S. Cl. .................. 15/111; 15/143.1; 15/160; 15/236.01; 15/246; 30/295; D4/118; D4/129; D32/42
[58] Field of Search .................. 15/248.1, 246, 15/236.01, 111, 143.1, 160; 30/340, 286, 295, 296.1, 298; D4/118, 129, 138; D32/41, 42, 48, 49

[56] References Cited

U.S. PATENT DOCUMENTS

| | | |
|---|---|---|
| 36,309 | 8/1862 | Jansen . |
| D. 282,604 | 2/1986 | Whitaker . |
| D. 307,077 | 4/1990 | Bryant . |
| D. 358,491 | 5/1995 | Hoagland . |
| 358,875 | 8/1887 | Nichols . |
| D. 366,962 | 2/1996 | Whitaker . |
| 499,842 | 6/1893 | Long ........................ 15/248.1 |
| 856,168 | 6/1907 | Lykken . |
| 1,674,207 | 6/1928 | Krill . |
| 1,715,907 | 6/1929 | Dragelin . |
| 2,824,323 | 2/1958 | Tos et al. . |
| 2,901,824 | 9/1959 | Zullo ........................... 30/295 |
| 3,487,491 | 1/1970 | Dunn . |
| 3,538,605 | 11/1970 | Smith ......................... 30/295 |
| 4,285,087 | 8/1981 | Sapronetti ................... 15/111 |
| 4,516,870 | 5/1985 | Nakazato . |
| 4,987,682 | 1/1991 | Minnick ...................... 30/295 |
| 5,317,779 | 6/1994 | Hoagland . |
| 5,632,090 | 5/1997 | Smith .......................... 30/319 |

*Primary Examiner*—Robert J. Warden, Sr.
*Assistant Examiner*—Kaj K. Olsen
*Attorney, Agent, or Firm*—Griffin,Butler,Whisenhunt & Szipl, LLP

[57] ABSTRACT

A cleaning apparatus (10, 10', 10") includes a hand shield (14, 16, 16') with an attachment device (64, 68, 68') thereon for selectively attaching the hand shield to a cleaning tool (12, 12') for protecting a hand gripping a grip portion (32) of an elongated handle of the cleaning tool when the cleaning tool is manipulated to clean a surface such as a hot grill.

17 Claims, 5 Drawing Sheets

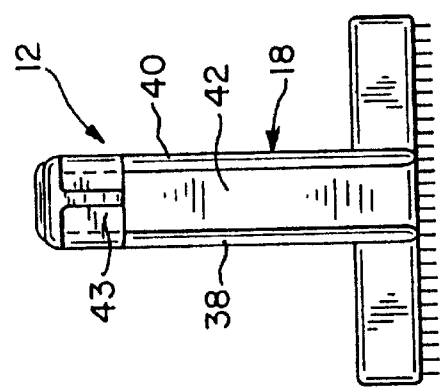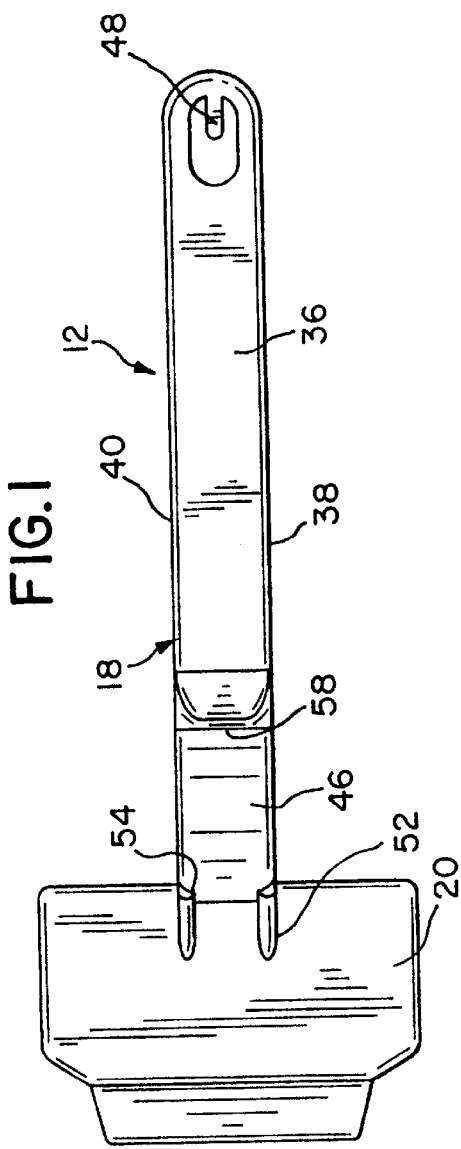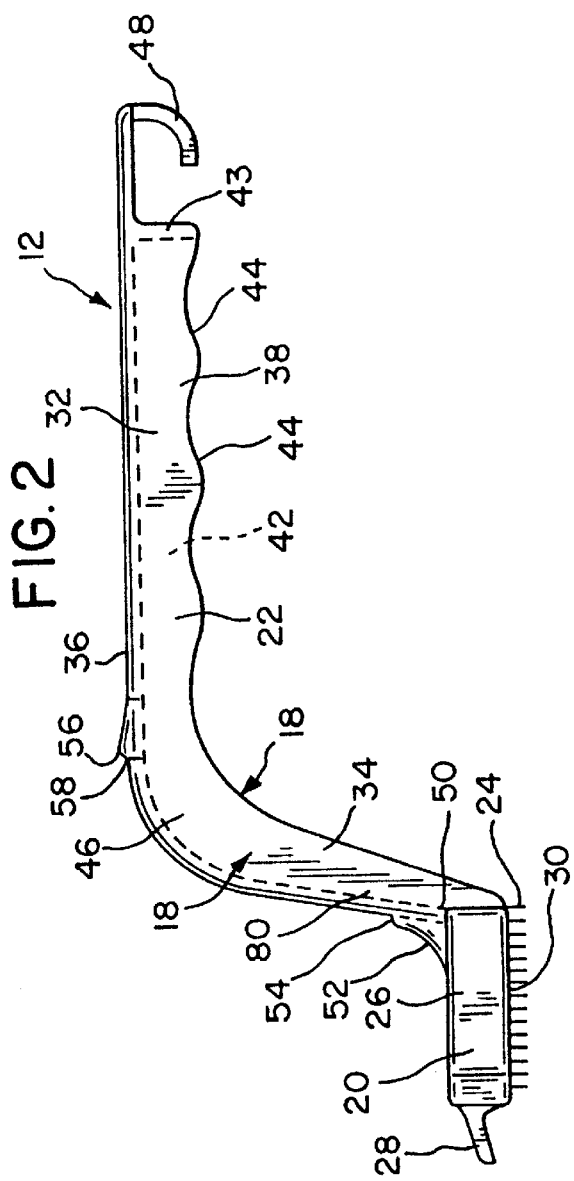

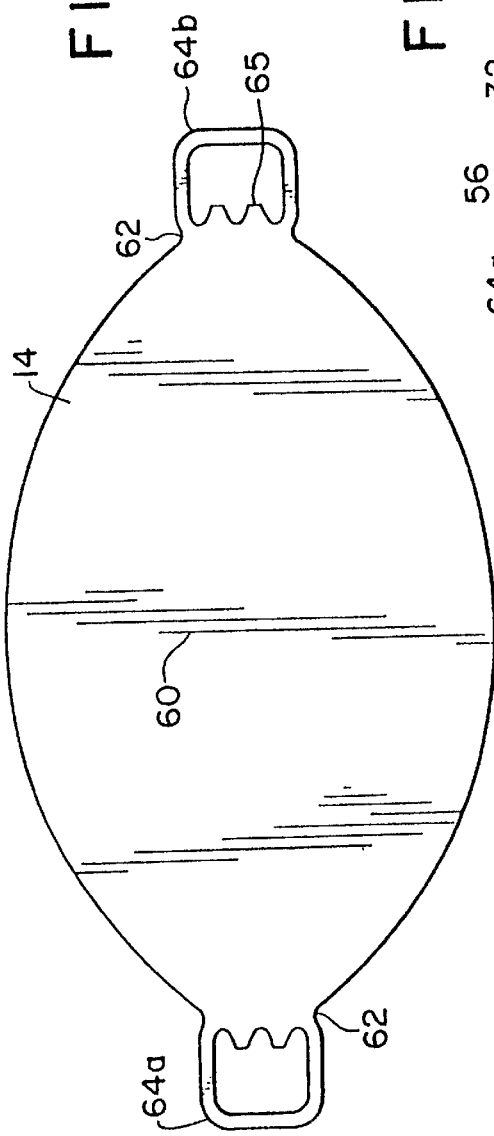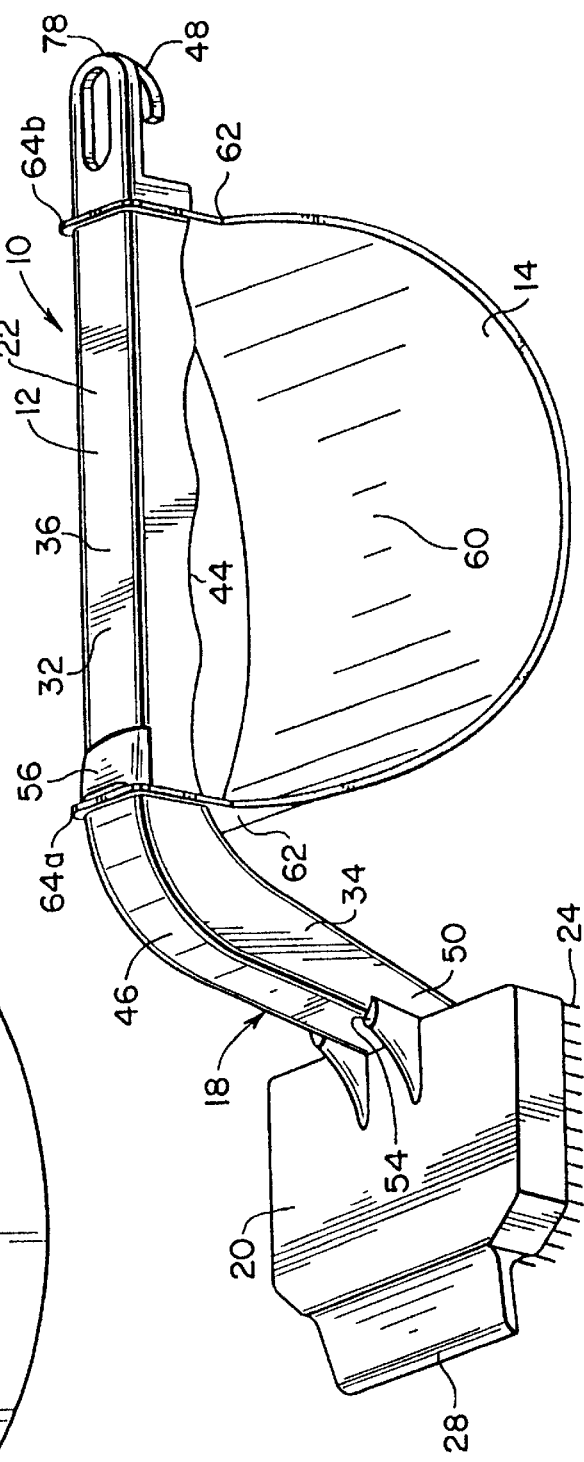

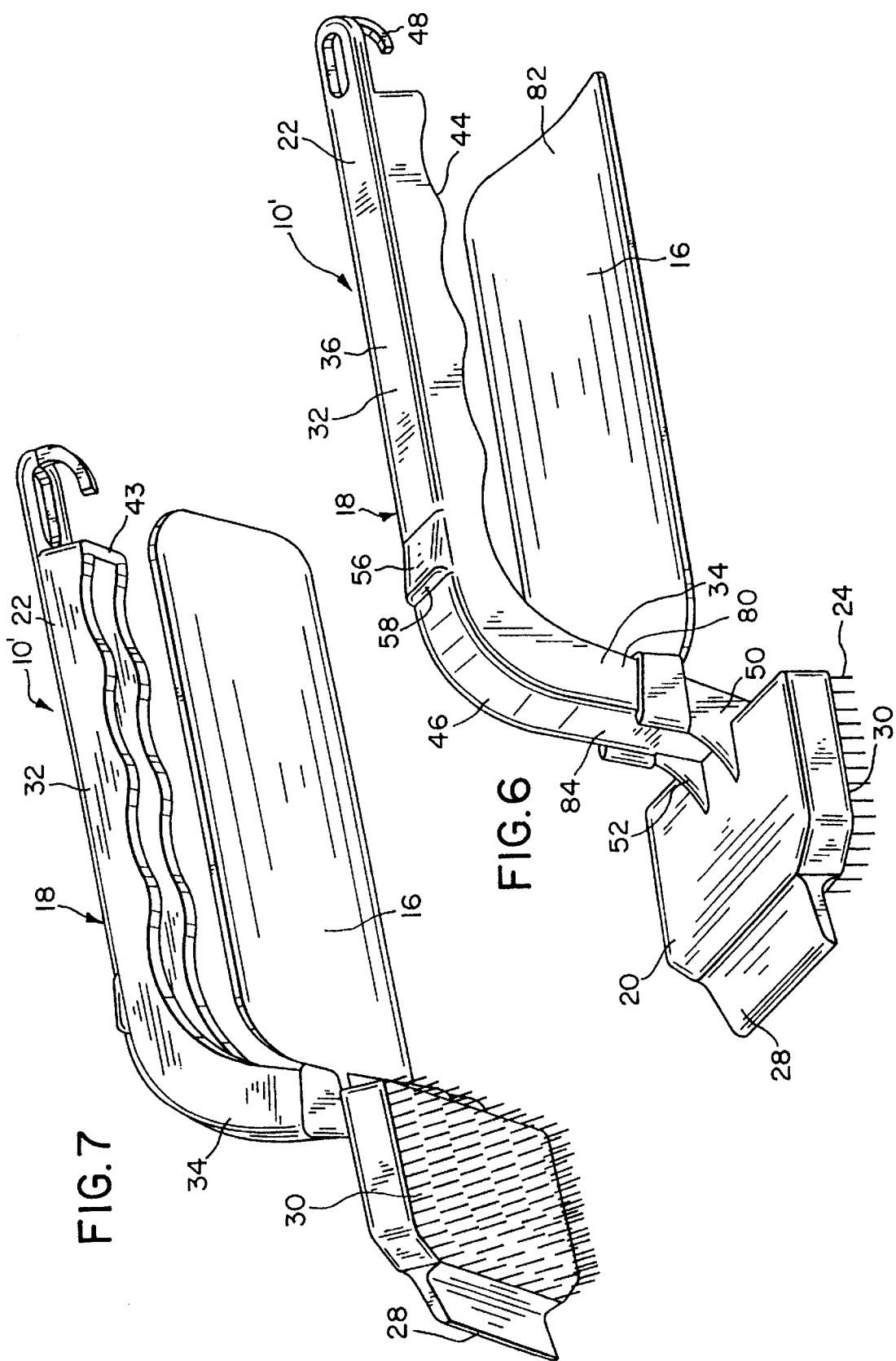

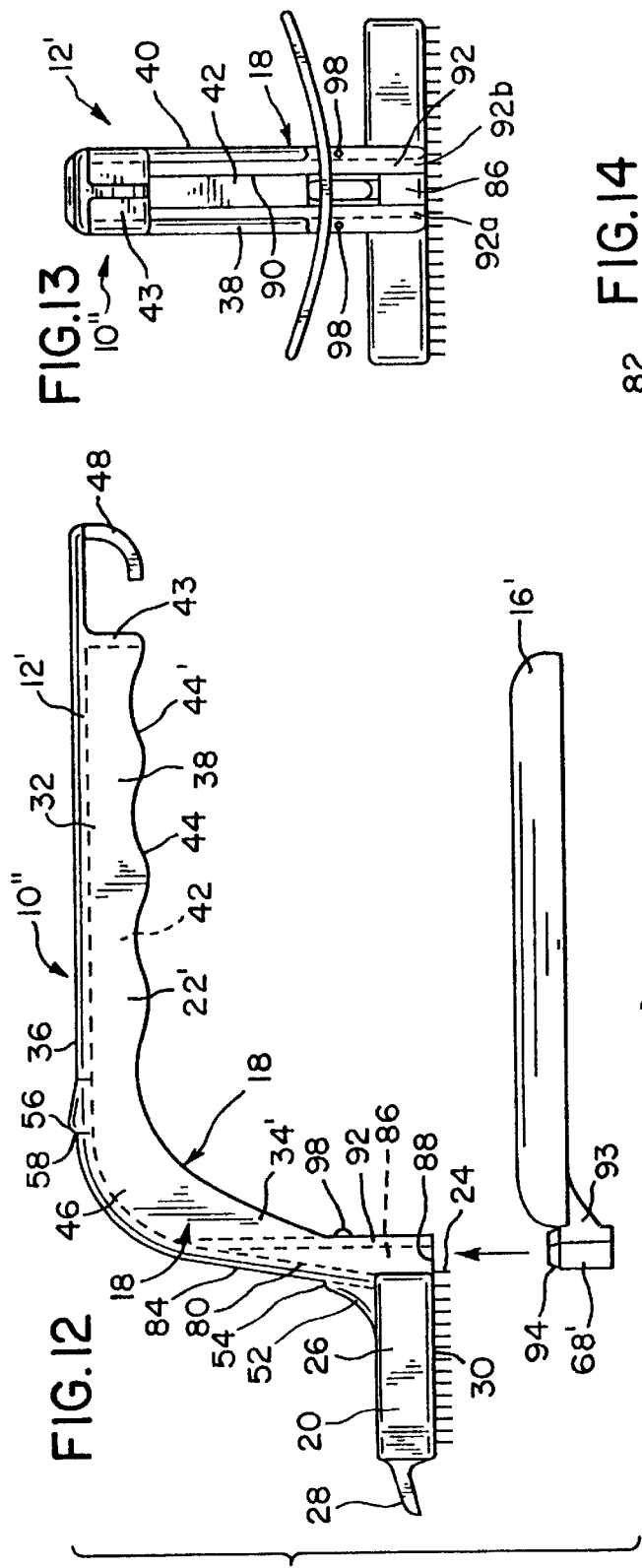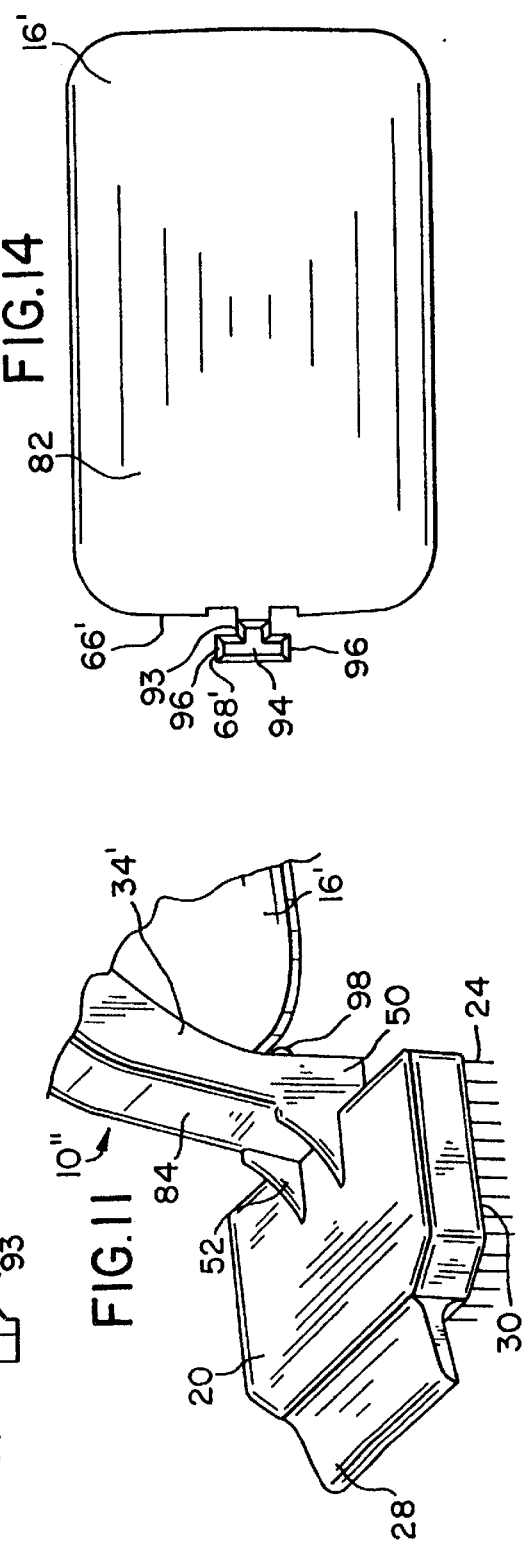

CLEANING APPARATUS

This application is a continuation-in-part application of application Ser. No. 09/047,528, filed Mar. 25, 1998, now abandoned.

BACKGROUND OF THE INVENTION

This invention relates generally to cleaning apparatus, such as a cleaning tool, or brush, which also includes a hand shield.

Prior-art portable cleaning tools, including scrappers, brushes, and the like exist in many varied forms. A few examples of such varied cleaning tools, spanning the years, include a utility kitchen brush described in U.S. Pat. No. 5,317,779 to Hoagland, a cleaning implement described in U.S. Pat. No. 856,168 to Lykken and a scrubbing brush described in U.S. Pat. No. 36,309 to Schweizer et al. A difficulty with most such cleaning tools is that when they are used users often scrape their knuckles and/or get cleaning chemicals on their hands. Thus, it is an object of this invention to provide a shield for use with a portable cleaning tool which protects a user's hand when the cleaning tool is being used. Similarly, it is an object of this invention to provide a portable cleaning apparatus including a hand shield and cleaning tool which is not unduly restricted in its use.

A number of prior art brushes and pads have been specifically designed for primarily cleaning grills. Examples of such tools are described in U.S. Pat. No. 2,824,323 to Tos et al; U.S. Pat. No. 3,487,491 to Dunn; U.S. Pat. No. D307,077 to Bryant; U.S. Pat. No. D358,491 to Hoagland; U.S. Pat. No. D282,604 to Whitaker; and U.S. Pat. No. D366,962 to Whitaker. A problem with most of the devices described in these prior art patents is that they cannot be conveniently used with hot grills. In this regard, it is often desirable to clean grills when they are extremely hot, however, with most grill brushes, one must place his hand relatively close to a grill where it receives an undue amount of radiated and convected heat. Thus, it is an object of this invention to provide a cleaning apparatus which can be conveniently and safely used for cleaning hot grills.

It has been suggested to apply drip shields along water-supply-pipe handles of brushes to prevent water from running along the pipe handles to users of window and automobile washing apparatus. U.S. Pat. No. 358,875 to Nichols; U.S. Pat. No. 1,674,207 to Krill; and U.S. Pat. No. 1,715,907 to Drageln disclose such washing apparatus. Although these shields protect users from water running along the water-supply-pipe handles, because of their positions they do not protect user's hands from liquids, chemicals and the like which are splashed from cleaning heads of the cleaning tools. Further, these cleaning shields can sometimes get in the way and cannot be remove without disassembling the water-supply-pipe handles.

Similarly, it has been suggested to place a cover, or shield on a handle of a water-supplied griddle-cleaning brush to protect a hand of an operator, "from splashes of water or detergent", in U.S. Pat. No. 4,516,870 to Nakazato. Although such a shield described in the Nakazato patent is sometimes helpful, especially in the particular water-supplied situation described by Nakazato, it also can at other times be quite awkward to use and, on occasion, can get in the way.

Thus, it is another object of this invention to provide a cleaning apparatus which includes a shield for shielding a user's hand only when desired so that the shield does not obstruct use of the cleaning apparatus when no shield is needed. Similarly, it is an object of this invention to provide a cleaning apparatus which is convenient to use for cleaning both hot and cold grills at any location. It is also an object of this invention to provide such a cleaning apparatus which can be constructed relatively inexpensively.

Finally, it is an object of this invention to provide a shield for a grill-cleaning tool which can easily transform the grill-cleaning tool from a cold-grill-cleaning tool to a hot-grill-cleaning tool, and vice versa.

SUMMARY OF THE INVENTION

According to principles of this invention, a cleaning apparatus includes a hand shield with an attachment device for selectively attaching the hand shield to, and detaching it from, a cleaning tool. When attached, the hand shield extends between a user's hand which is gripping a gripping portion of an elongated handle of the cleaning tool and a surface being cleaned.

In one embodiment of the cleaning tool, a head of the cleaning tool and a hand-grip portion of an elongated handle thereof are approximately parallel with one another and are rigidly linked together by a transverse portion of the elongated handle.

A molded shield of this invention is rigid and includes an attaching device at one end thereof for snapping about or being inserted into a mounting area of the transverse portion to hold the molded shield to the transverse portion.

A stamped shield of this invention is flexible and has attaching devices at opposite ends thereof. The elongated handle of the cleaning tool is attached to these attaching devices, with the attaching devices engaging the handle so as to bow the stamped shield away from the handgrip portion, thereby leaving a space for a user's hand.

BRIEF DESCRIPTION OF THE DRAWINGS

The invention is described and explained in more detail below using embodiments shown in the drawings. The described and drawn features, in other embodiments of the invention, can be used individually or in preferred combinations. The foregoing and other objects, features and advantages of the invention will be apparent from the following more particular description of the invention, as illustrated in the accompanying drawings in which reference characters refer to the same parts throughout the different views. The drawings are not necessarily to scale, emphasis instead being placed upon illustrating the principles of the invention in a clear manner.

FIG. 1 is a top plan view of a cleaning tool of a cleaning apparatus of this invention;

FIG. 2 is a side elevational view of the cleaning tool of FIG. 1;

FIG. 3 is a rear-end elevational view of the cleaning tool of FIG. 1;

FIG. 4 is a top plan view of a stamped shield which is part of a cleaning apparatus of this invention;

FIG. 5 is a top isometric view of the a cleaning apparatus of this invention including the cleaning tool of FIG. 1 with the stamped shield of FIG. 4 mounted thereon;

FIG. 6 is a top isometric view of another cleaning apparatus of this invention including the cleaning tool of FIG. 1 with a molded shield, as is depicted in FIGS. 8–10, mounted thereon;

FIG. 7 is a bottom isometric view of the cleaning apparatus of FIG. 6;

FIG. 11 is an isometric, cutaway, view of another cleaning apparatus of this invention having a male attachment device for a molded shield and a female slot in a cleaning tool for receiving the male attachment device;

FIG. 12 is a side, exploded, elevational view of the apparatus of FIG. 11;

FIG. 13 is a rear elevational view of the cleaning apparatus of FIG. 11; and

FIG. 14 is a top plan view of the molded shield of FIG. 11.

DETAILED DESCRIPTION OF THE INVENTION

Figure 8:
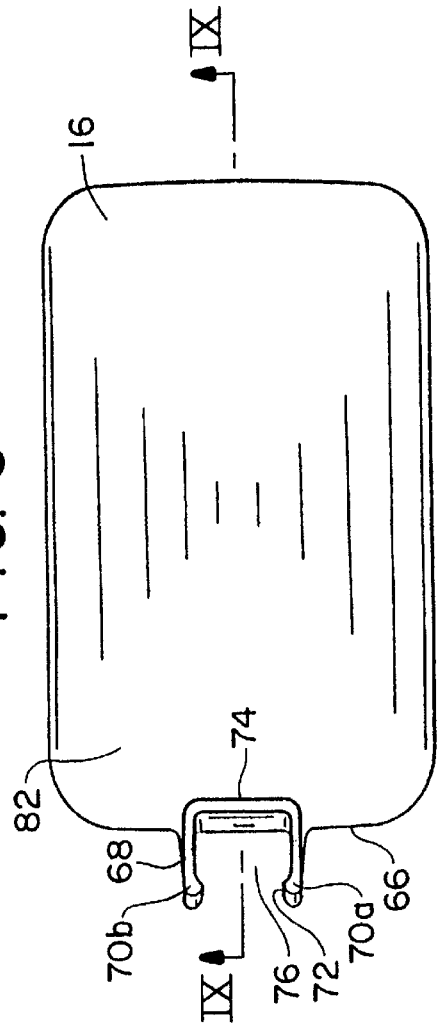
FIG. 8 is a top plan view of the molded shield of the cleaning apparatus of FIGS. 6 and 7.

Each of first and second cleaning apparatus 10 and 10', FIGS. 5 and 6, of this invention includes a cleaning tool 12 (FIGS. 1–3) respectively with a selectively attachable hand shield thereon. In the FIG. 5 embodiment, the selectively attachable hand shield is a stamped shield 14 and in a second embodiment of FIG. 6, the selectively attachable hand shield is a molded shield 16.

The cleaning tool 12 includes a rigid molded body 18 (molded of polypropylene for example), comprising a head 20 and an elongated handle 22, with bristles 24 extending outwardly from the head 20. The rigid molded body 18 is molded as one piece of a hard resinous plastic. The head 20 forms a relatively thin plate with a scraper 28 extending outwardly from one end edge thereof, away from the elongated handle 22. The bristles 24 are attached to a lower broad surface 30 of the plate 26 and extend approximately perpendicular away from the broad surface 30.

The elongated handle 22 generally has two portions, a grip portion 32 and a transverse portion 34. As can be seen in FIG. 2, the grip portion extends approximately parallel to the broad surface 30 of the broad plate 26 of the head 20, but offset therefrom in a direction away from the bristles 24. The transverse portion 34 rigidly attaches the grip portion 32 of the handle 22 to the head 20. The elongated handle 22 is closed at a top wall 36 thereof as well as at sidewalls 38 and 40; however, it is open at a hollow underside 42 thereof. A rear end of the hollow underside 42 is closed by an end wall 43. Bottom edges 44 of the sidewalls 38 and 40, at the grip portion 32 of the elongated handle 22, are shaped to fit fingers of a user's hand gripping the grip portion 32. A transition curved portion 46 of the elongated handle 22, at an intersection between the grip portion 32 and the transverse portion 34, is enlarged in cross-section relative to the grip portion 32. A hook 48 extends rearwardly from the end wall 43 to be used for hanging the cleaning tool on a bracket. An attachment portion 50 of the transverse portion 34, for coupling the transverse portion 34 to the head 20, includes corner reinforcements 52 with flat abutment faces 54 directed along the transverse portion, away from the bristles 24. A ramp-shaped thumb support 56 is molded on the top wall 36 to slope away from the top wall 36 and form a blunt end-wall surface 58 facing the enlarged curved portion 46.

In one embodiment, the transverse portion 34 forms an angle of about 105° with each of the grip portion 32 and the head 20, and a plane of a top surface of the grip portion 32 is spaced approximately 3 inches from a plane of the broad surface 30 of the head 20. This allows room for the shields 14 and 16.

The stamped shield 14, depicted in FIGS. 4 and 5, is stamped, or cut, from a thin sheet of relatively flexible, but stiff, resinous plastic such as polystyrene. As can be seen in FIG. 5, the stamped shield 14 is flexible so that it can be easily bent, or bowed, to form an arched shield for protecting a hand gripping the grip portion 32 of the elongated handle 22. In this regard, the stamped shield 14 is extremely broad at a center portion 60 thereof, but tapers toward opposite ends 62. At each of the opposite ends 62, the stamped shield 14 forms attachment loops 64a and b for receiving the elongated handle 22. The stamped shield 14 also includes teeth 65 which extend into openings defined by the loops 64, directed away from the center portion 60.

Figure 9:
FIG. 9 is a cross sectional view taken on line IX—IX in FIG. 8.
Figure 10:
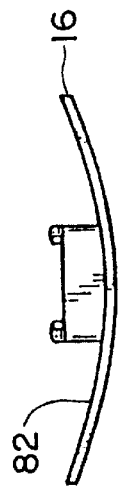
FIG. 10 is a rear end elevational view of the molded shield of FIG. 8.

The molded shield 16, depicted in FIGS. 8–10, is elongated, has a uniformed width, and has a rigid curved width-wise cross-section as can be seen in FIG. 10. At a mounting end 66 of the molded shield 16 there is a selectively attachable-and-detachable attachment device 68. The entire molded shield is molded as one piece of a rigid plastic, such as polypropylene. The attachment device 68 includes opposite snapping arms 70a and b, each of which has a protrusion 72 at its outer free end directed toward the other's protrusion. The opposite snapping arms 70a and b, along with an inner wall 74 form a cavity 76 with an open side at the outer free ends of the snapping arms 70a and b for snugly receiving a mounting area 80 of the transverse portion 34 of the elongated handle 22 just above the abutment faces 54.

Describing now use of the cleaning apparatus of this invention, using the first, stamped, shield 14 embodiment 10, (FIG. 10) the cleaning tool 12 is manipulated to insert a back end 78 of the elongated handle 22 thereof through a front attachment loop 64a with the center portion 60 of the stamped shield 14 being positioned at the hollow underside 42 of the elongated handle 22. The front attachment loop 64a is then slid along the elongated handle 22 until it is forced over the ramp-shaped thumb support 56, as is shown in FIG. 5. The front attachment loop 64a cannot be moved further toward the head 20 along the elongated handle 22 because the enlarged curved portion 46 is larger than the opening defined by the front attachment loop 64a. Thus, the front attachment loop 64a is held between the enlarged curved portion 46 and the end-wall surface 58 of the thumb support 56. The back attachment loop 64b is threaded onto the back end 78 of the elongated handle 22 and it is slid along the elongated handle 22 toward the front attachment loop 64a. As the back attachment loop 64b approaches the front attachment loop 64a the center portion 60 of the stamped shield 14 bows, or arches, as can be seen in FIG. 5. The back attachment loop 64b is shoved along the elongated handle 22 until its teeth 65 snap over the end wall 43 of the elongated handle 22. In this regard, the teeth 65 actually must be urged against the end wall 43 until they snap past it. The teeth 65 now prevent the back attachment loop 64b from sliding along the elongated handle 22 toward the back end 78. Thus, the stamped shield 14 is held on the elongated handle 22 in the bowed configuration depicted in FIG. 5. In this configuration, the broad center portion 60 of the hand shield 14 protects a hand of a user gripping the grip portion 32 from heat radiating from below the hollow underside 42 of the elongated handle 22, that is, from a hot grill being cleaned with the bristles 24. The user can then manipulate the first cleaning apparatus depicted in FIG. 5 to brush a hot grill, for example, with the bristles 24 without being unduly affected by heat radiating from the hot grill.

It should be understood that in the above description the front and back attachment loops 64a and b can be reversed, because they are identical in structure.

The molded shield 16 of the second cleaning apparatus 10', depicted in FIGS. 6 and 7, is used by manipulating the cleaning tool 12 and the molded shield 16 to move the mounting area 80 of the transverse portion 34 of the elongated handle 22 into the cavity 76 of the attachment device 68 with an axis of elongation of the molded shield 16 extending adjacent to, and parallel to, the elongated handle 22, with a concaved side 82 of the molded shield facing the elongated handle 22. Once the mounting area 80 of the transverse portion 34 of the elongated handle 22 is in the cavity 76, the protrusions 72 snap about a front wall 84 of the transverse portion 34 for securely holding the molded shield onto the transverse portion 34. Thus, the molded shield 16 is held below the grip portion 32 of the elongated handle 22, as is depicted in FIGS. 6 and 7, for protecting a hand of a user gripping the grip portion 32 from heat radiating from a grill being cleaned. The molded shield 16 is prevented from sliding down the transverse portion 34 by the abutment faces 54 on the corner reinforcements 52. Additional abutment faces can also be provided on an opposite side of the transverse portion 34.

It will be understood by those of ordinary skill in the art that each of the stamped shield 14 and the molded shield 16 can be easily, and selectively removed from the cleaning tool 12 by reversing the above described procedures.

A second molded shield 16' of a third cleaning apparatus 10", depicted in FIGS. 11–14, is similar to the molded shield 16 of FIGS. 8–10 but in this embodiment, an attachment device 68' is a T-shaped male member rather than being a female member as is the attachment device 68 of FIGS. 8–10.

In this embodiment, a transverse portion 34' of an elongated handle 22' is modified to form a female slot 86 for receiving the T-shaped (see FIG. 14) male attachment device 68' molded onto a mounting end 66' of the molded shield 16' from its open bottom end 88. It can be seen in FIG. 13 that the slot 86 is also open at a rear wall 92, facing in a direction in which the grip portion 32 of the elongated handle 22' extends, in that it has a slit 19 in the rear wall 92 of the transverse portion 34'. In this regard, this rear wall 92 is actually formed of two opposite wall members 92a and 92b which respectively extend toward one another on opposite sides of the slit 90. As can be seen in FIG. 12, the rear wall 92 does not always follow a contour of a bottom side 44' of the transverse portion 34', but rather extends vertically upwardly to converge toward the front wall 84 of the transverse portion 34'.

The attachment device 68' of the molded shield 16', as mentioned above, has a T-shape, with a shaft 93 of the T being molded onto a main portion of the molded shield 16'. A top edge 94 of the male attachment device 68' is beveled so that the attachment device 68' can be more easily inserted into the bottom end 88 of the slot 86 and for wedging between the front and rear walls 84 and 92 of the transverse portion 34'. When the attachment device 68' is inserted into the slot 86 from a direction indicated by an arrow in FIG. 12, the shaft 93 of the T slides along the slit 90 while arms 96 of the T are held between the rear wall members 92a and b and the front wall 84. Eventually, as the male attachment device 68' is slid upwardly in the slot 86 its beveled top edge 94 becomes wedged between the front wall 84 and the rear wall members 92a and b. In an enhanced embodiment, there is a dimple 98 on each of the rear wall members 92a and b over which the mounting end 66' of the molded shield 16' snaps for preventing the molded shield 16' from sliding downwardly out of the slot 86.

In addition to being held in the slot 86 by wedging between the front and rear walls 84 and 92 and/or the projecting dimples 98, the attachment device 68' is also held therein by other friction and binding. In this regard, weight of the molded shield 16' tends to try to rotate the molded shield 16' downwardly which causes the attachment device 68' to try to rotate in the slot 86, thereby binding it.

The male shield attachment of FIGS. 11–14 has proven to have a number of benefits. In this respect, this embodiment allows quick and easy attachment and detachment of the molded shield 16' while at the same time providing a secure attachment thereof. Further, this embodiment appears to be aesthetically superior to the female attachment device 68 of the cleaning apparatus 10 of FIG. 6 because the attachment device 68' is not as visible. Having an attachment-device-receiving end opening of the slot 86 at an end 88 of the transverse portion 34', and of the elongated handle 22', is particularly effective.

It should be appreciated that the stamped shield 14 of FIGS. 4 and 5 could also employ male attachment devices that mate with female slots in the elongated handle 22.

An advantage provided by cleaning apparatus of this invention is that the shields thereof can be selectively attached and detached from portable cleaning tools. Thus, when one is cleaning a grill, for example, which is not hot, he need not use a shield of this invention. Without such a shield, a user can more easily manipulate the cleaning tool 12. However, when one must clean a hot grill, a selectively-attachable shield of this invention can be quickly and easily snapped onto the cleaning tool for protecting the hand of the user from grill heat radiation.

The stamped and molded shields of this invention are particularly beneficial because they can be economically manufactured and are relatively easy to use.

While the invention has been particularly shown and described with reference to a preferred embodiment, it will be understood by those skilled in the art that various changes in form and detail may be made therein without departing from the spirit and scope of the invention. For example, the scraper 28 could be formed of metal as a separate piece. Also, the bristles 24 could be replaced by a scraping pad. Still further, the snap-On hand shields can have other configurations as well as other selective, snapping, attachment/detachment devices. For example, the stamped shield could be made to rotate about the elongated handle for use, for example, with a dual headed brush.

The invention claimed is:

1. A cleaning apparatus comprising:
 a cleaning apparatus including a cleaning head having a cleaning element thereon for being wiped across a surface for cleaning the surface, and an elongated handle rigidly attached to the cleaning head and extending away therefrom, said elongated handle having a grip portion for being gripped by a user while the user manipulates the cleaning head to wipe the cleaning element across the surface; and
 a hand shield for being attached to and detached from the cleaning tool, said hand shield, when attached to said cleaning tool, extending between the grip portion of said handle and a surface being wiped by the cleaning element, said hand shield including an attachment for attaching said hand shield to said cleaning tool with said elongated handle, including said grip portion, remaining rigidly attached to said cleaning head;
 wherein an axis of elongation of the grip portion of the elongated handle and a surface of the cleaning head to which the cleaning element is attached respectively lie in plane segments which are laterally spaced from one another, the grip portion being rigidly joined to the cleaning head by a transverse portion of the elongated handle which extends between these two plane segments; and wherein the attachment is for attaching the hand shield to the transverse portion of the elongated handle.

2. The cleaning apparatus of claim 1 wherein said plane segments are substantially parallel to each other and wherein the shield is elongated and is rigid to extend from the transverse portion substantially parallel to, and adjacent to, the grip portion.

3. The cleaning apparatus of claim 2 wherein the shield is not engaged with the elongated handle in the plane segment of the grip portion.

4. The cleaning apparatus of claim 2 wherein the attachment is for selectively attaching the hand shield to said transverse portion and wherein the attachment includes a male member for being inserted into a slot in said transverse portion.

5. The cleaning apparatus of claim 4 wherein the slot in said transverse portion has an open end at an end of said transverse portion for receiving said attachment and a side slit through which a connection between said attachment and a main portion of said shield passes as said attachment is slid along said slot.

6. The cleaning apparatus of claim 1 wherein the attachment is for selectively attaching the hand shield to said transverse portion and wherein the attachment includes resilient arms for snapping about said transverse portion.

7. The cleaning apparatus of claim 1 wherein the attachment is for selectively attaching the hand shield to said transverse portion and wherein the attachment includes a male member for being inserted into a slot in the transverse portion.

8. The cleaning apparatus of claim 7 wherein the slot in said transverse portion has an open end at an end of said transverse portion for receiving said attachment and a side slit through which a connection between said attachment and a main portion of said shield passes as said attachment is slid along said slot.

9. The cleaning apparatus as in claim 1 wherein the attachment selectively attaches and detaches the hand shield to and from the transverse portion of the elongated handle.

10. A cleaning apparatus including a cleaning head having a cleaning element thereon for being wiped across a surface for cleaning the surface, and an elongated handle rigidly attached to the cleaning head and extending away therefrom, said elongated handle having a grip portion for being gripped by a user while the user manipulates the cleaning head to wipe the cleaning element across the surface; and a hand shield for being selectively attached to and detached from the cleaning tool, said hand shield, when attached to said cleaning tool, extending between the grip portion of said handle and a surface being wiped by the cleaning element, said hand shield including an attachment for being selectively attached to and detached from said cleaning tool while said elongated handle, including said grip portion, remains rigidly attached to said cleaning head;

wherein an axis of elongation of the grip portion of the elongated handle and a surface of the cleaning head to which the cleaning element is attached respectively lie in plane segments which are laterally spaced from one another, the grip portion being rigidly joined to the cleaning head by a transverse portion of the elongated handle which extends between these two plane segments;

wherein the attachment includes two attachment elements at opposite ends of the shield for attaching to the elongated handle at two places.

11. The cleaning apparatus of claim 10 wherein the shield is flat when it is not mounted on the cleaning tool and is in a- relaxed attitude but which has a center portion which is caused to bow outwardly when said hand shield is mounted on the cleaning tool.

12. The cleaning apparatus of claim 11 wherein each of the attachment elements comprises a loop through which the elongated handle passes.

13. The cleaning apparatus of claim 12 wherein the loops define openings for receiving the elongated handle and wherein the shield further includes protruding teeth extending into the openings.

14. A cleaning apparatus including a cleaning head having a cleaning element thereon for being wiped across a surface for cleaning the surface, and an elongated handle rigidly attached to the cleaning head and extending away therefrom, said elongated handle having a grip portion for being gripped by a user while the user manipulates the cleaning head to wipe the cleaning element across the surface; and a hand shield for being selectively attached to and detached from the cleaning tool, said hand shield, when attached to said cleaning tool, extending between the grip portion of said handle and a surface being wiped by the cleaning element, said hand shield including an attachment for being selectively attached to and detached from said cleaning tool while said elongated handle, including said grip portion, remains rigidly attached to said cleaning head;

wherein the attachment includes two attachment elements at opposite ends of the shield for attaching to the elongated handle at two places;

wherein the shield is flat when it is not mounted on the cleaning tool and is in a relaxed attitude but which has a center portion which is caused to bow outwardly when said hand shield is mounted on the cleaning tool.

15. The cleaning apparatus of claim 14 wherein each of the attachment elements comprises a loop through which the elongated handle passes.

16. A cleaning tool including a cleaning head having a cleaning element thereon for being wiped across a surface for cleaning the surface, and an elongated handle rigidly attached to the cleaning head and extending away therefrom, said elongated handle having a grip portion for being gripped by a user while the user manipulates the cleaning head to wipe the cleaning element across the surface; and a hand shield for being selectively attached to and detached from the cleaning tool, said hand shield, when attached to said cleaning tool, extending between the grip portion of said handle and the surface being wiped by the cleaning element, said hand shield including an attachment for being selectively attached to and detached from said cleaning tool while said elongated handle, including said grip portion, remains rigidly attached to said cleaning head;

wherein the attachment includes a male member for being inserted into a slot in the elongated handle.

17. The cleaning apparatus of claim 16 wherein said slot has an open end at an end of said elongated handle for receiving said attachment.

* * * * *